(12) United States Patent
McHugh et al.

(10) Patent No.: US 9,038,187 B2
(45) Date of Patent: *May 19, 2015

(54) INSIDER THREAT CORRELATION TOOL

(75) Inventors: Brian McHugh, Charlotte, NC (US);
Ronald Ramcharran, Hackensack, NJ (US); Peter J. Langsam, New York, NY (US); Timothy C. Metzger, Hoboken, NJ (US); Dan P. Antilley, Fort Mill, SC (US); Jonathan W. Deats, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 290 days.

This patent is subject to a terminal disclaimer.

(21) Appl. No.: 12/694,075

(22) Filed: Jan. 26, 2010

(65) Prior Publication Data

US 2011/0184877 A1 Jul. 28, 2011

(51) Int. Cl.
*G06F 11/00* (2006.01)
*G06Q 10/10* (2012.01)
(Continued)

(52) U.S. Cl.
CPC ............... *G06Q 10/10* (2013.01); *G06F 21/51* (2013.01); *G06F 21/50* (2013.01); *G06Q 30/018* (2013.01); *G06Q 30/0185* (2013.01)

(58) Field of Classification Search
CPC .............................. G06F 21/577; G06F 21/50
USPC .......................................................... 726/22
See application file for complete search history.

(56) References Cited

U.S. PATENT DOCUMENTS 5,623,600 A 4/1997 Ji et al.
6,151,643 A 11/2000 Cheng et al.
(Continued)

FOREIGN PATENT DOCUMENTS

EP 1335559 A2 8/2003
GB 2420961 A 6/2006
GB 2436161 A 9/2007

OTHER PUBLICATIONS

"An Insider Threat Prediction Model" Miltiadis Kandias, Alexios Mylonas, Nikos Virvilis, S. Katsika s, J. Lopez, and M. Soriano (Eds.): TrustBus 2010, LNCS 6264, pp. 26-37, 2010. Springer-Verlag Berlin Heidelberg 2010.*

(Continued)

*Primary Examiner* — Ashok Patel
*Assistant Examiner* — Gary Gracia
(74) *Attorney, Agent, or Firm* — Banner & Witcoff, Ltd.; Michael A. Springs

(57) ABSTRACT

Systems and methods for calculating threat scores for individuals within an organization or domain are provided. Aspects of the invention relate to computer-implemented methods that form a predictive threat rating for user accounts. In one implementation, a first threat score representing a first time period may be calculated. The first threat score may be compared with aspects of the same user accounts for a second time period. Weighting schemes may be applied to certain activities, controls, and/or user accounts. Further aspects relate to apparatuses configured to execute methods for ranking individual user accounts. Certain embodiments may not block transmissions that violate predefine rules, however, indications of such improper transmission may be considered when constructing a threat rating. Blocked transmissions enforced upon a user account may also be received. Certain activity, such as accessing the internet, may be monitored for the presence of a security threat and/or an ethics threat.

21 Claims, 3 Drawing Sheets

(51) Int. Cl.
*G06F 21/51* (2013.01)
*G06F 21/50* (2013.01)
*G06Q 30/00* (2012.01)
*G06F 12/14* (2006.01)

(56) References Cited

U.S. PATENT DOCUMENTS

| | | |
|---|---|---|
| 6,269,456 B1 | 7/2001 | Hodges et al. |
| 6,785,820 B1 | 8/2004 | Muttik et al. |
| 6,792,543 B2 | 9/2004 | Pak et al. |
| 7,080,000 B1 | 7/2006 | Cambridge |
| 7,080,408 B1 | 7/2006 | Pak et al. |
| 7,114,183 B1* | 9/2006 | Joiner ............................ 726/23 |
| 7,151,447 B1 | 12/2006 | Willms et al. |
| 7,228,565 B2 | 6/2007 | Wolff et al. |
| 7,237,258 B1* | 6/2007 | Pantuso et al. .................. 726/11 |
| 7,237,267 B2 | 6/2007 | Rayes et al. |
| 7,278,019 B2 | 10/2007 | Norman |
| 7,340,438 B2 | 3/2008 | Nordman et al. |
| 7,418,733 B2 | 8/2008 | Connary et al. |
| 7,457,965 B2 | 11/2008 | Tamura et al. |
| 7,509,680 B1 | 3/2009 | Sallam |
| 7,546,334 B2 | 6/2009 | Redlich et al. |
| 7,739,211 B2 | 6/2010 | Coffman et al. |
| 7,895,448 B1 | 2/2011 | Satish |
| 8,256,004 B1 | 8/2012 | Hill et al. |
| 8,275,899 B2 | 9/2012 | Beckett, III et al. |
| 8,280,844 B2 | 10/2012 | Warn et al. |
| 8,321,958 B1* | 11/2012 | Fleming et al. ................. 726/29 |
| 8,474,042 B2* | 6/2013 | Sorensen et al. ................ 726/22 |
| 8,478,708 B1 | 7/2013 | Larcom |
| 8,479,286 B2* | 7/2013 | Dalcher et al. .................. 726/22 |
| 8,966,036 B1* | 2/2015 | Asgekar et al. ............... 709/223 |
| 2003/0145228 A1 | 7/2003 | Suuronen et al. |
| 2003/0154396 A1* | 8/2003 | Godwin et al. ............... 713/201 |
| 2003/0191957 A1 | 10/2003 | Hypponen et al. |
| 2003/0236995 A1* | 12/2003 | Fretwell, Jr. .................. 713/200 |
| 2004/0044912 A1* | 3/2004 | Connary et al. ............... 713/201 |
| 2004/0153650 A1 | 8/2004 | Hillmer |
| 2005/0044406 A1 | 2/2005 | Stute |
| 2005/0050334 A1 | 3/2005 | Liang et al. |
| 2005/0086526 A1 | 4/2005 | Aguirre |
| 2005/0183143 A1 | 8/2005 | Anderholm et al. |
| 2005/0187934 A1 | 8/2005 | Motsinger et al. |
| 2005/0188221 A1* | 8/2005 | Motsinger et al. ............ 713/201 |
| 2005/0188222 A1 | 8/2005 | Motsinger et al. |
| 2005/0188423 A1 | 8/2005 | Motsinger et al. |
| 2005/0197889 A1* | 9/2005 | Prigogin et al. ................. 705/10 |
| 2005/0198099 A1* | 9/2005 | Motsinger et al. ............ 709/200 |
| 2005/0203881 A1 | 9/2005 | Sakamoto et al. |
| 2005/0273851 A1 | 12/2005 | Raju Datla et al. |
| 2006/0004594 A1* | 1/2006 | Doliov ............................. 705/1 |
| 2006/0020814 A1 | 1/2006 | Lieblich et al. |
| 2006/0041505 A1 | 2/2006 | Enyart |
| 2006/0064370 A1* | 3/2006 | Mojsilovic et al. ............ 705/38 |
| 2006/0064740 A1* | 3/2006 | Kelley et al. ..................... 726/3 |
| 2006/0178918 A1 | 8/2006 | Mikurak |
| 2007/0079379 A1 | 4/2007 | Sprosts et al. |
| 2007/0113281 A1* | 5/2007 | Leach ............................ 726/22 |
| 2007/0143851 A1 | 6/2007 | Nicodemus et al. |
| 2007/0169194 A1* | 7/2007 | Church et al. .................. 726/23 |
| 2007/0180510 A1 | 8/2007 | Long et al. |
| 2007/0186282 A1* | 8/2007 | Jenkins ........................... 726/22 |
| 2007/0204345 A1 | 8/2007 | Pereira et al. |
| 2007/0222589 A1 | 9/2007 | Gorman et al. |
| 2007/0226796 A1* | 9/2007 | Gilbert et al. .................. 726/22 |
| 2007/0245420 A1 | 10/2007 | Yong et al. |
| 2007/0268880 A1* | 11/2007 | Bellur et al. .................. 370/338 |
| 2008/0034424 A1 | 2/2008 | Overcash et al. |
| 2008/0082348 A1* | 4/2008 | Paulus et al. ..................... 705/1 |
| 2008/0109730 A1 | 5/2008 | Coffman et al. |
| 2008/0162385 A1* | 7/2008 | Madani et al. .................. 706/12 |
| 2008/0181213 A1 | 7/2008 | Ovsiannikov et al. |
| 2008/0198231 A1 | 8/2008 | Ozdemir et al. |
| 2008/0222706 A1* | 9/2008 | Renaud et al. .................... 726/4 |
| 2008/0222734 A1 | 9/2008 | Redlich et al. |
| 2008/0244034 A1* | 10/2008 | Shannon et al. .............. 709/217 |
| 2008/0250484 A1* | 10/2008 | Chong et al. ..................... 726/7 |
| 2008/0256602 A1* | 10/2008 | Pagan .............................. 726/3 |
| 2008/0271143 A1* | 10/2008 | Stephens et al. ................ 726/22 |
| 2008/0282339 A1 | 11/2008 | Nakae et al. |
| 2009/0013410 A1 | 1/2009 | Kaler et al. |
| 2009/0037997 A1 | 2/2009 | Agbabian et al. |
| 2009/0043724 A1* | 2/2009 | Chesla ............................ 706/52 |
| 2009/0044005 A1 | 2/2009 | Komura et al. |
| 2009/0064332 A1* | 3/2009 | Porras et al. ................... 726/23 |
| 2009/0077666 A1 | 3/2009 | Chen et al. |
| 2009/0113062 A1* | 4/2009 | Woodman ..................... 709/229 |
| 2009/0126023 A1* | 5/2009 | Yun et al. ........................ 726/25 |
| 2009/0129573 A1* | 5/2009 | Gavan et al. .................. 379/189 |
| 2009/0132689 A1* | 5/2009 | Zaltzman et al. ............. 709/223 |
| 2009/0132813 A1 | 5/2009 | Schibuk |
| 2009/0138592 A1* | 5/2009 | Overcash et al. ............. 709/224 |
| 2009/0178139 A1 | 7/2009 | Stute et al. |
| 2009/0178142 A1* | 7/2009 | Lieblich et al. ................ 726/25 |
| 2009/0178144 A1 | 7/2009 | Redlich et al. |
| 2009/0198765 A1 | 8/2009 | Stamos et al. |
| 2009/0207740 A1 | 8/2009 | Crotti et al. |
| 2009/0241188 A1 | 9/2009 | Komura |
| 2009/0249131 A1 | 10/2009 | Mitomo |
| 2009/0254572 A1 | 10/2009 | Redlich et al. |
| 2009/0271863 A1 | 10/2009 | Govindavajhala et al. |
| 2009/0293128 A1* | 11/2009 | Lippmann et al. ............. 726/25 |
| 2009/0328209 A1* | 12/2009 | Nachenberg .................... 726/22 |
| 2010/0064039 A9* | 3/2010 | Ginter et al. .................. 709/224 |
| 2010/0121833 A1 | 5/2010 | Johnston |
| 2010/0125911 A1* | 5/2010 | Bhaskaran ...................... 726/23 |
| 2010/0169971 A1* | 7/2010 | Raviv ............................. 726/23 |
| 2010/0212010 A1* | 8/2010 | Stringer et al. ................. 726/22 |
| 2010/0262706 A1* | 10/2010 | Rodriguez et al. ........... 709/229 |
| 2010/0269175 A1 | 10/2010 | Stolfo et al. |
| 2010/0281543 A1 | 11/2010 | Golomb et al. |
| 2011/0078156 A1* | 3/2011 | Koss ............................ 707/748 |
| 2011/0125658 A1 | 5/2011 | Lanxner et al. |
| 2011/0153166 A1 | 6/2011 | Yester |
| 2011/0167011 A1* | 7/2011 | Paltenghe et al. ............ 705/320 |
| 2011/0185056 A1 | 7/2011 | McHugh et al. |
| 2011/0202969 A1* | 8/2011 | Warn et al. ....................... 726/1 |
| 2011/0225650 A1* | 9/2011 | Margolies et al. .............. 726/22 |
| 2012/0066763 A1 | 3/2012 | McHugh et al. |
| 2013/0239210 A1* | 9/2013 | Stolfo et al. .................... 726/22 |
| 2014/0082691 A1* | 3/2014 | Warn et al. ....................... 726/1 |

OTHER PUBLICATIONS

"A preliminary model of end user sophistication for insider threat prediction in IT systems" G.B. Magklaras, S.M. Furnell Network Research Group, School of Computing, Communications and Electronics, University of Plymouth, Plymouth, United Kingdom.*

"Using security metrics coupled with predictive modeling and simulation to assess security processes" Yolanta Beres Marco Casassa, Jonathan Griffin, Simon Shiu, EM '09 Proceedings of the 2009 3rd International Symposium on Empirical Software Engineering and Measurement, pp. 564-573.*

Insider Threat Prediction Tool: Evaluating the probability of IT misuse, G.B Magklaras, S.M Furnell, Computers & Security vol. 21, No. 1, pp. 62-73, 2002.*

"Mitigating Insider Threat Using Human Behavior Influence Models" Air Force Institute of Technology, Thesis, Anthony J. Puleo, BS Captain, USAF, Jun. 2006.*

"Insider Cyber Threat Situational Awareness Framwork using Dynamic Bayesian Networks" Ke Tang, Ming-Tian Zhou, and Wen-Yong Wang, Proceedings of 2009 4th International Conference on Computer Science & Education.*

"A Survey of Insider Attack Detection Research" Malek Ben Salem, Shlomo Hershkop, and Salvatore J. Stolfo, Advances in Information Security vol. 39, 2008, pp. 69-90.*

International Search Report and Written Opinion issued in related International Patent Application No. PCT/US11/21152, dated Nov. 1, 2011.

International Search Report and Written Opinion issued in related International Patent Application No. PCT/US11/21149, dated Oct. 26, 2011.

(56) References Cited

OTHER PUBLICATIONS

International Search Report and Written Opinion issued in related International Patent Application No. PCT/US11/21152, dated Nov. 1, 2011
International Search Report and Written Opinion issued in related application No. PCT/US11/32515, dated Jun. 27, 2011.
Office Action in related U.S. Appl. No. 12/694,067 mailed Jul. 30, 2013.
Non-Final office action for related U.S. Appl. No. 13/298,597 mailed Sep. 11, 2013.
Non-Final office action in related U.S. Appl. No. 13/903,215 mailed Sep. 12, 2013.
Office action in related U.S. Appl. No. 13/736,594 mailed Oct. 2, 2013.
International Search Report and Written Opinion of International application No. PCT/US11/44144 mailed Dec. 6, 2011.
Office Action for U.S. Appl. No. 12/841,332 mailed Oct. 1, 2013.
Office action for U.S. Appl. No. 12/841,332 mailed Mar. 7, 2013.
Office action for U.S. Appl. No. 12/841,332 mailed Sep. 26, 2012.
Office action for U.S. Appl. No. 12/841,323 mailed Nov. 29, 2012.
Office action for U.S. Appl. No. 12/841,323 mailed Jun. 6, 2012.
Notice of Allowance for U.S. Appl. No. 12/841,323 mailed Apr. 11, 2013.
International Search Report and Written Opinion for International application No. PCT/US11/44138 mailed Dec. 6, 2011.
Office action for U.S. Appl. No. 13/298,594 mailed Nov. 14, 2013.
Office action for U.S. Appl. No. 13/298,594 mailed Jun. 19, 2013.
Office action for U.S. Appl. No. 12/694,067 mailed May 22, 2012.
Office action for U.S. Appl. No. 12/694,067 mailed Dec. 21, 2011.
Office action for U.S. Appl. No. 12/694,067 mailed Nov. 7, 2011.
Notice of Allowance for U.S. Appl. No. 12/829,882 mailed Jun. 17, 2013.
Office action for U.S. Appl. No. 12/829,882 mailed Mar. 12, 2013.
Office action for U.S. Appl. No. 12/829,882 mailed Aug. 10, 2012.
Notification of Grant from Singapore Patent Office for Patent P-No. 184508 dated Nov. 15, 2013.
Office action for U.S. Appl. No. 11/932,510 mailed Dec. 2, 2013.
Office action for U.S. Appl. No. 11/932,510 mailed Jul. 11, 2013.
Office action for U.S. Appl. No. 11/932,510 mailed Feb. 7, 2011.
Office action for U.S. Appl. No. 11/932,510 mailed Sep. 28, 2010.
International Search Report and Written Opinion for International application No. PCT/US2008/082087 mailed Jan. 13, 2009.
Examination Report for application No. GB1007370.8 mailed Jan. 24, 2012.
Notification of Grant for patent application No. GB2466755 mailed Jan. 2, 2013.
Office action for related U.S. Appl. No. 12/694,067 mailed Feb. 24, 2014.
Office action for related U.S. Appl. No. 12/694,067 mailed Feb. 13, 2014.
Notice of Allowance for related U.S. Appl. No. 12/694,067 mailed Dec. 9, 2013.
Notice of Allowance for related U.S. Appl. No. 12/694,067 mailed Mar. 21, 2014.
Notice of Allowance in Related U.S. Appl. No. 12/841,332 mailed Mar. 6, 2014.
Notice of Allowance in related U.S. Appl. No. 13/298,594 mailed May 12, 2014.
Notice of Allowance in related U.S. Appl. No. 13/298,597 mailed Apr. 14, 2014.

* cited by examiner

INSIDER THREAT CORRELATION TOOL

BACKGROUND

Increasingly, organizations are responsible for protecting individual's confidential and proprietary electronic information. For example, financial institutions collect and retain vast amounts of personal information in electronic format, therefore the storage and distribution of such information must be closely monitored. This is also true for medical organizations that must effectively collect, store and distribute vast amounts of electronic data while complying with HIPPA (Health Insurance Privacy and Portability Act) and other regulations. Regulating access and distribution of electronic confidential information is more difficult than physical data as it is more readily copied and distributed. Thus, organizations with such information must closely monitor their employees and other individuals to ensure the information is protected, not only from disclosure, but inadvertent contamination.

Prior systems attempted to block certain activities, such as visiting certain sites on the Internet or accessing certain storage devices containing confidential information. Unfortunately, however, blocking sites alone does not provide any indication of a threat. Furthermore, while it may be desirable to block transmissions that pose a serious threat to the organization, blocking each transmission that violates any rule could reduce productivity, efficiency, and frustrate both the holder of the blocked user account, the IT department, and/or any third party that needs to receive the transmission, such as time-sensitive material. Additionally, many systems apply a "one size fits all" security policy, which cannot consider the type of user account being monitored.

Current systems also do not provide an overall threat rating that considers several different security measures for individuals within an entity or domain. For example, even if an entity has enacted several individual security measures, a specific user may not meet the "threshold" level to be considered a threat for each individual security measure, despite the fact that they have significantly high activity for several measures, and thus pose an overall threat. In contrast, a user who exceeds one security "threshold" level for only a single measure may incorrectly be deemed a security threat to the entity or domain. In this regard, current systems don't adequately consider individual characteristics of accounts. For example, certain job responsibilities may require some users to have higher than usual activity levels.

Current systems for collecting data from different systems strain valuable resources. Often, the time spent collecting data exceeds the time available to stop or minimize the threat. Therefore, the lag in data does not present an up-to-date indication of the entity's current threats. Moreover, current systems do not allow quick analysis of threats that may readily be navigated for more precise information. Novel systems and methods that improve upon one or more of these and other deficiencies would be desirable.

BRIEF SUMMARY

Aspects of the embodiments address one or more of the issues mentioned above by disclosing methods, computer readable media, and apparatuses configured to calculate threat ratings. Aspects of the invention relate to computer implemented methods that form a predictive threat rating for a plurality of individuals. The plurality of individuals may be members of an organization, such as a corporation or business entity. In one embodiment, the predictive rating is calculated for employees of an organization.

In one implementation, a first threat score corresponding to a first time period may be calculated for several user accounts. The first time period may be relatively short, such as less than 3 days. In one embodiment, the first time period may be about 48 hours. In another embodiment, the first time period may be about 1 day. Those skilled in the art will appreciate that the exact length of the first time period may be different, and may depend on the type of user accounts, the type of organization hosting the accounts, the length of a second time period (discussed below) and/or other factors. In one embodiment, each user account may have access to a first network, such as the Internet. Some of the user accounts may also have access to a second network, such as a restricted portion of the organization's intranet.

In one embodiment, certain activity, such as accessing the internet, may be monitored for the presence of a security threat, an ethics threat, or combinations thereof. The monitoring of activity may include blocked activity, in which the user account was prohibited from undertaking an action or viewing an internet page. An indication of blocked transmissions enforced upon a user account may also be received. The indication may be restricted to a specific network or group of networks, such as the Internet and/or specific network resources within an organization's intranet that may be restricted to certain user accounts In one embodiment, an indication of any blocked and/or non-blocked communications that meet a predefined criterion from a targeted communication application may be received. Exemplary targeted communication accounts include but are not limited to: e-mail and instant messaging. Thus, certain embodiments may not block transmissions that violate one or more predefine rules, however, indications of such improper transmission may be considered when constructing a threat rating in accordance with various embodiments.

In another embodiment, it may be determined if any communication through a network is transmitted or received through an unauthorized protocol. An indication whether at least one security application is associated with the user account may be received. If the security application is not associated with the account, a specific sub-score may be assigned. Further embodiments determine if the security application has been tampered with or removed, and if so, may assign a different sub-score. In one embodiment, the security application may monitor illegal storage attempts.

In one embodiment, certain activity may be weighted. For example, weights may be applied to: a security threat, an ethics threat, blocked communication through the targeted communication application, communication through the targeted communication application meeting a predefined criterion, accessing the centralized store, an attempted illegal storage attempt, and combinations thereof. In other embodiments, certain user accounts may be weighted. Weighting may be based upon, for example, the account having access to certain data storage devices, whether the account is associated with a security application, job criteria associated with the user of the account, or meeting any predefined criteria.

In further embodiments, the threat score from the first time period may be compared, or otherwise analyzed in conjunction with a second threat score corresponding to a second time period to create an overall threat score. Further weighting may also be considered in one or more embodiments. In one embodiment, an activity weight is applied to certain activities that occurred during a first time frame within the first or second time period. For example, illustrative time frames may include, but are not limited to: a predefined quantity of time before the user associated with the user account is scheduled to utilize a network, a predefined quantity of time before or after the average time frame the user account is active on a network, a holiday, and combinations thereof. Weighting may depend on one or more factors, including for example, the user account's average activity, average activity of other user accounts, or combinations thereof.

Aspects of the embodiments may be provided in a computer-readable medium having computer-executable instructions to perform one or more of the process steps described herein. These and other aspects of the embodiments are discussed in greater detail throughout this disclosure, including the accompanying drawings.

Further aspects relate to systems and methods for displaying the ranking of a plurality of user accounts. In one embodiment, the ranking of several user accounts may be transmitted through a network and displayed as part of a graphical user interface. In one embodiment, a system which comprises a processor and a memory may be configured to transmit electronic signals configured to display the ranking of the user accounts. Further embodiments relate to receiving a user input selecting a graphical representation of certain activities or criteria utilized in the ranking of the user accounts. In one embodiment, a graphical display of blocked communications may be displayed. In further embodiments, it may be displayed whether the blocked communication was a security threat, an ethics threat or combinations thereof. Any aspect of a user account that may be utilized in calculating the threat score may be displayed.

Further embodiments allow the reception of a user input providing a new account weight to be applied to at least one of the plurality of user accounts. The accounts, or at least a portion thereof, may be reranked using the new account weight. In another embodiment, a user input may provide a new weight for at least one control. In further embodiments, a user input may select a user account from the plurality of user accounts, an in response, ranking for a plurality of controls may be displayed for the selected account. Further embodiments may permit the displaying of data relating a user account's average activity (i.e, per control) and/or the average activity of other user accounts.

BRIEF DESCRIPTION OF THE DRAWINGS

The present invention is illustrated by way of example and not limited in the accompanying figures in which like reference numerals indicate similar elements and in which.

DETAILED DESCRIPTION

In accordance with various aspects of the embodiments, methods, computer-readable media, and apparatuses are disclosed that assist in the creation, implementation, and review of predictive threat ratings for several user accounts. The user accounts may be related to an organization, such as employees of an organization.

Figure 1:
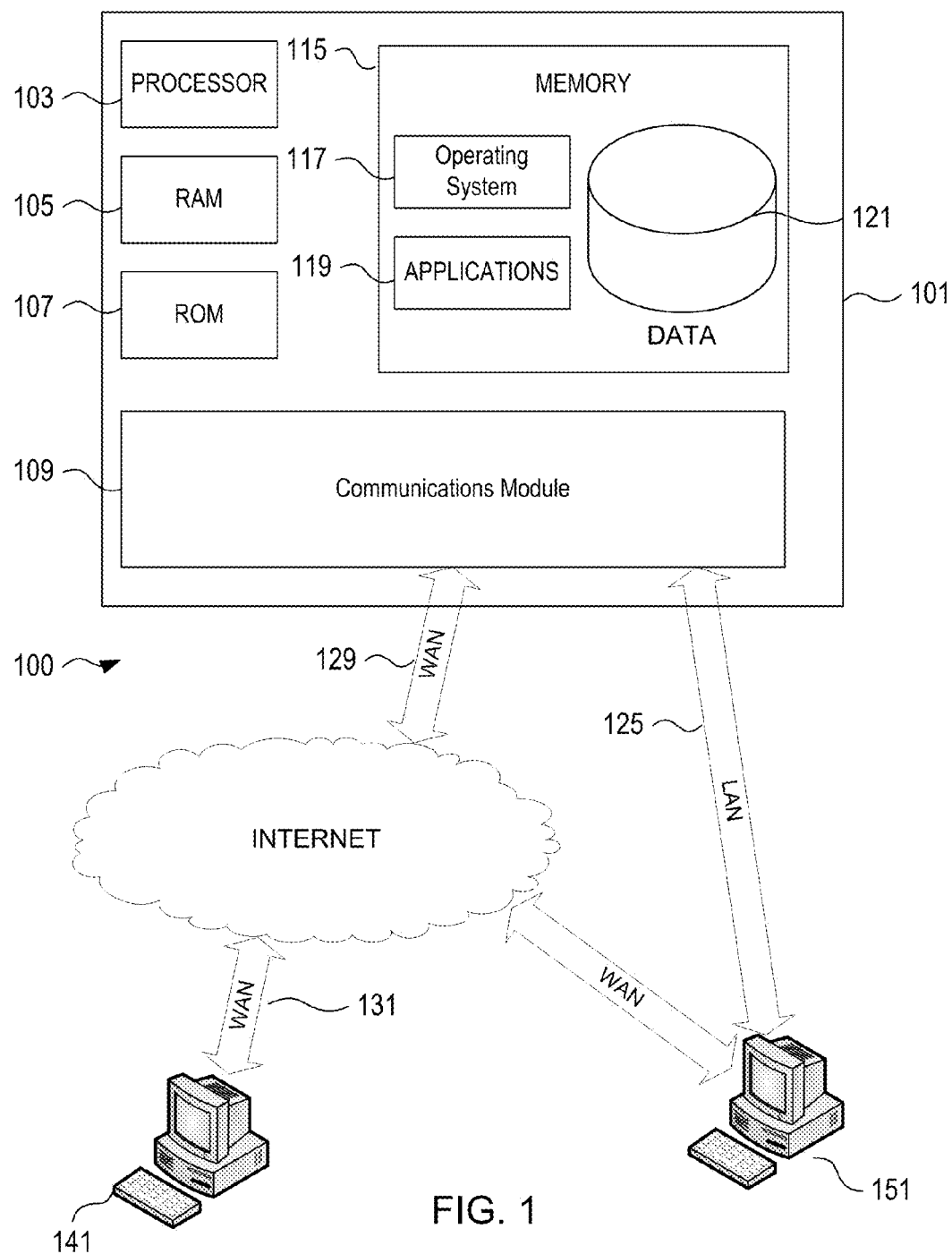
FIG. 1 shows an illustrative operating environment in which various aspects of the embodiments may be implemented.
Figure 2:
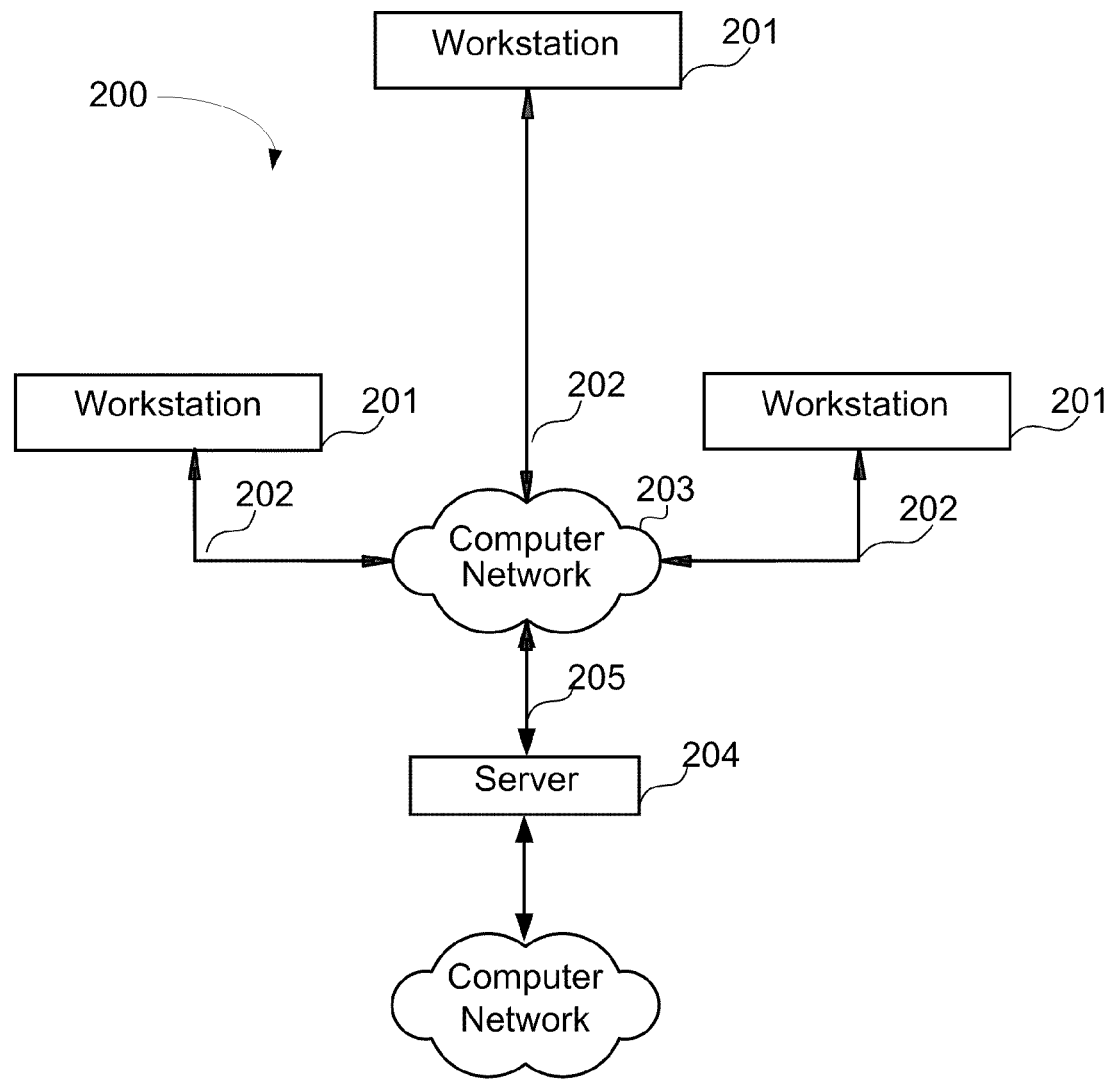
FIG. 2 is an illustrative block diagram of workstations and servers that may be used to implement the processes and functions of certain aspects of the embodiments.
Figure 3:
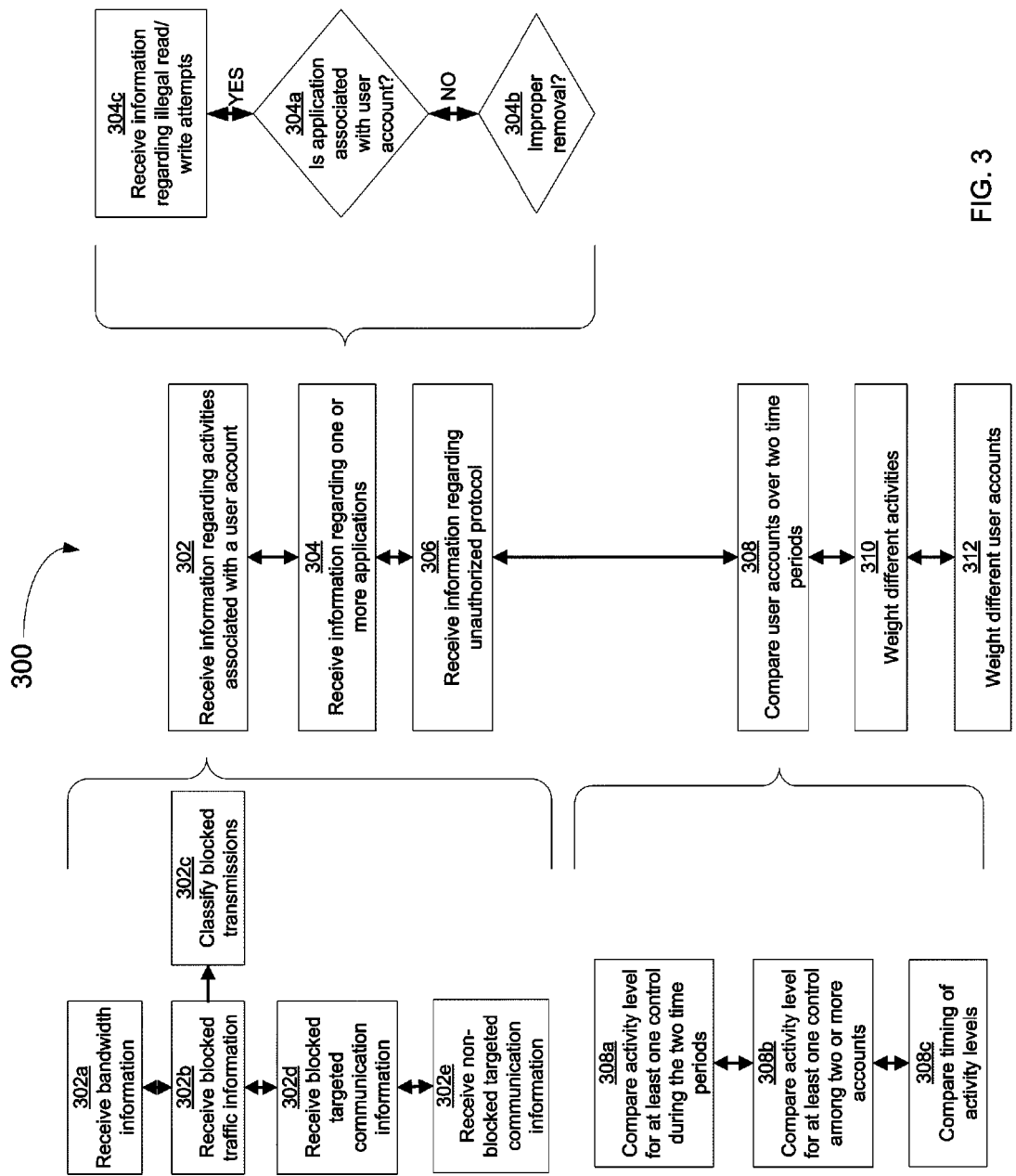
FIG. 3 shows a flow diagram of an illustrative method in accordance with one embodiment.

FIG. 1 illustrates an example of a suitable computing system environment 100 (e.g., for which may be part of illustrative system 200 and/or perform one or more aspects of illustrative process 300 (as shown in FIGS. 2 and 3, respectively). The computing system environment 100 is only one example of a suitable computing environment and is not intended to suggest any limitation as to the scope of use or functionality of the embodiments. The computing system environment 100 should not be interpreted as having any dependency or requirement relating to any one or combination of components shown in the illustrative computing system environment 100.

The embodiments are operational with numerous other general purpose or special purpose computing system environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more are applications representing the application data stored in RAM memory 105 while the computing device is on and corresponding software applications (e.g., software tasks), are running on the computing device 101. In, one embodiment, RAM 105 and/or any other memory may include a security application. The security application may assist in monitoring activity of one or more user accounts on one or more other devices, such as devices 141 and 151, which are described in more detail below Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). As discussed above, memory 115 may comprise one or more security applications, some of which will be described below.

Database 121 may provide centralized storage of response information. Processor 103 may access the response information from database 121 and process the response information that may be included in an interactive response to a user. While database 121 is shown to be internal to computing device 101, database 121 may be external to computing device 101 with some embodiments.

Computing device 101 may operate in a networked environment supporting connections to one or more remote computing devices, such as user terminals 141 and 151. Additional computing devices and the arrangement of such devices are described in illustrative embodiment shown in FIG. 2. The user computing devices 141 and 151 may be personal computing devices or servers that include many or all of the elements described above relative to the computing device 101.

The network connections depicted in FIG. 1 include connections through multiple networks. For example, in one embodiment, a local area network (LAN) 125, may be an organization's intranet, and a wide area network (WAN) 129, may be the Internet. In one embodiment implementing a LAN networking environment, computing device 101 may be connected to the LAN 825 through a network interface or adapter in the communications module 109. When used in a WAN networking environment, the server 101 may include a modem, modem, or interface in the communications module 109 or other means for establishing communications over the WAN 129, such as the Internet 131. Thus, from a security perspective, one user account may be configured to access a LAN, such as LAN 125, however, not to access one or more WANs, such as WANs 129/130.

It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. The network connections may also provide connectivity to a CCTV or image/iris capturing device.

Additionally, one or more application programs 119 used by the computing device 101, and/or user terminals 141/151 according to an illustrative embodiment, may include computer executable instructions for invoking user functionality related to communication including, for example, email, short message service (SMS), and/or other targeted communications applications that transmit communications from a user account to a second user account (whether internal or external to the organization or domain of the first user account).

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the embodiments is contemplated. For example, aspects of the method steps disclosed herein may be executed on a processor on a computing device 101. Such a processor may execute computer-executable instructions stored on a computer-readable medium.

Referring to FIG. 2, an illustrative system 200 for implementing methods according to some embodiments is shown. As illustrated, system 200 may include one or more workstations 201. In one embodiment, workstations 201 are similar to user terminals 141/151 shown in FIG. 1. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like. Connectivity may also be supported to a CCTV or image/iris capturing device.

With some embodiments, illustrative system 200 may support an interactive system as will be further discussed. For example, workstations 201 may function as user terminals and server 204 may function as a security application control system that monitors activities of multiple user accounts on workstations 201. As understood by those skilled in the art, the steps that follow in the FIGS may be implemented by one or more of the components in FIGS. 1 and 2 and/or other components, including other computing devices.

Aspects of the invention are directed to collecting, analyzing, and utilizing data to create a threat rating for several user accounts within an organization or domain. FIG. 3 shows flow diagram 300 for ranking a plurality of user accounts that represent a threat to an organization. In one embodiment, one or more of the "user account" may be associated with a particular individual, such as an employee of an organization. Thus, regardless of whether the individual is using user terminal 141, user terminal 151, or any workstation 201, the individual's actions may be tied to a particular user account. In an alternative embodiment, a "user account" may be associated with a particular computing device. Thus, in one embodiment, if any of a plurality of individuals use a particular computing device, such as user terminal 141, the computing device will be a specific user account. In another embodiment, a "user account" may be a combination of specific user(s) on specific computing device(s).

As would be understood by those skilled in the art, it is quite common for a subset of user accounts within an organization or domain to have access to resources not available to other user accounts within the same organization or domain. Unlike prior art systems, embodiments disclosed herein may be used to implement, monitor and review a ranking system across an organization or domain having user accounts with security features that differ from other user accounts. For example, in one embodiment, each user account may have access to a first network, such as the "Internet" through WAN 131 shown in FIG. 1, however, only a subset of those accounts may have access to a second network, such as specific resources accessible on the organization's or domain's intranet, such as through LAN 125. In one embodiment, the resources may include a centralized store of electronic data that is accessible from several different user terminals 141/151 or workstations 201.

In various embodiments, a plurality of activities serve as controls for monitoring the accounts over a first time period, such as 24-48 hours. Enabling the reception of data within the relatively short period allows IT or security personnel to act quickly to prevent or minimize any adverse events. In certain embodiments, monitoring the activity for about 24-48 ensures adequate collection of data. The values received for each control may be compared with values from the controls during a second time period. In the illustrated embodiment, block 302 may be implemented to receive an indication of values for one or more activities associated with a user account. In one embodiment, one or more computer-executable instructions measure at least a portion of the activities on computing devices, such as user terminals 141/151 and/or workstation 201. The computer-executable instructions may be read by processor 103 on device 101 shown in FIG. 1.

Exemplary activities are described below, however, those skilled in the art with the benefit of this disclosure will readily understand that additional or fewer activities may be measured without departing from the scope of the invention. Further, while the exemplary activities are described in relation to block 302, those skilled in the art will understand that such actions may be conducted in relation to one or more additional processes.

In one embodiment, one or more values indicating the bandwidth utilized by a user account may be received at block 302*a*. The values may indicate the amount of data received, transmitted, or combinations thereof. The measured valued may indicate the transfer of data through a first network, such as through WAN 131 to the Internet. Thus, in certain embodiments, the values may not measure all traffic through multiple networks, but rather may just be indicative of specific traffic, such as sites that are external to an organization's resources.

An indication of blocked transmissions enforced upon a user account may also be received (see e.g., block 302*b*). The indication of blocked transmissions may be restricted to a specific network or group of networks. For example, in one embodiment, indications may be for activity on the Internet. Yet in other embodiments, the indications may include activity on the Internet as well as specific network resources within an organization's intranet that may be restricted to certain user accounts. Thus, unlike certain prior art systems, certain embodiments may allow for the quantification of how many instances the user account's actions on a network are blocked.

Further embodiments may classify the blocked transmissions as posing an ethical threat or a security threat. Although certain prior art systems may classify the type of site by the type of material offered on the site, such as adult content or gambling, such classification is often insufficient or too labor intensive for security or IT professionals to determine if the site is a security threat and/or an ethical threat. Thus, such classification may be inapplicable for determining the threats to the organization or domain. Block 302*c* may be implemented to classify the blocked transmission(s). In one embodiment, one or more of the blocked transmissions are classified as either posing an ethical threat, a security threat, or both an ethical threat and a security threat. In one embodiment, content classified as adult, gambling, and/or dating may be considered an ethical threat. For example, sites that may contain objectionable material or material that could not be needed for the individual's job duties may be deemed an ethical violation. In one embodiment, sites that are routinely utilized to transfer proprietary data, such as ftp (file transfer protocol) sites or peer-to-peer (P2P) sites may be classified as a security threat. Sites that promote illegal activity, such as introducing malware or viruses may be deemed a security threat. Indeed, certain sites may pose both a security threat and an ethical threat.

Further embodiments may also monitor (or receive indications from the monitoring of) targeted communications applications. As used herein, a "targeted communication application" encompasses those applications that allow a first user to directly communicate with another individual. For example, common targeted communication applications include, but are not limited to: electronic mail (e-mail), instant messaging (IM), chatting, and combinations thereof. Such applications may allow one account associated with a first user, which may be an employee of the organization to transmit and/or receive electronic information directly with a second account associated with a second user, which may be external to the organization. Often, organizations filter outgoing email and block transmissions that violate one or more predefined criteria. For example, if the transmission contains inappropriate material or is of a certain size, it may be blocked or otherwise prevented from reaching the intended account in the typical manner.

In one embodiment, block 302*d* may be implemented to receive an indication of blocked communication (transmissions) through a targeted communication application. The indication may indicate what application was blocked, why the application was blocked and other information. In one embodiment, the blocked communication is classified as a security and/or ethical threat. Such information may be stored in a database and accessible by a graphical user interface ("GUI"), including by methods described in more detail later in this disclosure. Indeed, any information collected, transmitted, or received herein may be preserved and utilized for display in a GUI.

In certain embodiments, non-blocked communications (transmission) through one or more targeted communication applications that violate at least one predefined criteria is considered (block 302*e*). Block 302*e* may be performed in conjunction with or independent of block 302*d*. In that regard, while it may be desirable to block transmissions that pose a serious threat to the organization, blocking each transmission that violates any rule could reduce productivity, efficiency, and frustrate both the holder of the blocked user account, the IT department, and/or any third party that needs to receive the transmission, such as time-sensitive material. Thus, certain embodiments may not block transmissions that violate one or more predefine rules, however, indications of such improper transmission may be considered when constructing a threat rating in accordance with various embodiments of the invention. In some embodiments, the non-blocked transmission may be altered to partially or wholly remedy the violation. For example, if an organization prohibits the transmission of certain identifying information, such as Social Security numbers, the number may be removed from the transmission and then transmitted.

While several different types of data are received within block 302, such as from sub-blocks 302a-302e, there is no requirement that the data is treated equally. Indeed, as discussed above, block 302c may be implemented to distinguish activities that may pose an ethical threat or a security threat. In this regard, certain aspects of this disclosure relate to the weighting of different data. Discussions relating to weighting are provided further in this disclosure, however, the reader is advised that such weighting may be conducting before, during, or after almost any process described herein. For example, data may be weighted as it is collected, further weighted in a sub-block (e.g., 302c), and data that is collected from several different sources may then be weighted when compared with other data. Illustrative processes will be discussed in more detail later.

Block 304 may be implemented to receive information regarding one or more applications associated with the user accounts. In one embodiment, the information relates to whether a security application is associated with the user account. The security application may be installed on user terminals 141/151 or workstation 201. In other embodiments, the security application may be active on a centralized server or device, such as device 101. Those skilled in the art will readily appreciate that one or more applications may be active at multiple locations and at different times. Block 304a may be implemented to determine if a specific application is associated with a user account. This process may be advantageous to detect new account users who may not have the security application. It may also be implemented to ensure that user accounts have an up-to-date version or patch of the application.

If at block 304a, it is determined that the user account is not associated with an application, block 304b may be implemented to determine if the application has been improperly disabled or removed. If it's determined at block 304a that the user account is associated with the security application, then one or more indications regarding the application may be received. In one embodiment, block 304c may be implemented to monitor (or receive an indication of) illegal storage attempts. For example, the security application may be implemented for data loss prevention purposes and can monitor illegal write attempts. For example, some user accounts may be prohibited from writing to removable storage devices, such as USB thumb drives. Thus, block 302c may provide an indication of any such attempts. While the illustrative embodiment is described in relation to "write" attempts, those skilled in the art will readily appreciate that "reading" from certain sources may also violate one or more predefined rules. Information associated with the illegal write/read attempts may also be collected. Illustrative information may include, but is not limited to: the filename, the size of the file, the location of the file, or any metadata regarding the file.

Further embodiments may determine if any communications are conducted using an unauthorized protocol. For example, employees of an organization may attempt to circumvent security measures by creating a self-signed security certificate or using a proxy server. Block 306 may be implemented to determine if transmissions through a first network (such as the Internet through WAN 129) is transmitted or received using an unauthorized protocol.

As discussed above, blocks 302-306 (as well as additional processes) may provide information regarding a user account's activity over a relatively short time period, such as 24-48 hours to quickly and effectively detect threats that may be posed against an organization. In certain embodiments, however, such as before major deadlines, user accounts may appear to show a rise in improper or unauthorized activity that is unwarranted. Furthermore, certain user accounts naturally will show more activity than other user accounts given the inherent nature of the individual's job associated with that user account. Thus, values obtained during the first time period may be compared with other values to more accurately determine the ranking. For example, in one embodiment, the values of controls received over the first time period (such as through blocks 302, 304, and/or 306) may be compared with values obtained over a second time period (i.e., block 308). In one embodiment, the second time period is longer in duration than the first time period. For example, the second time period may be about one month, about 45 days, or about 2 months. Indeed, any amount of time is to be within the scope of this disclosure. Further, the first and the second time periods may be overlapping, such as the first time frame may include the most recent 2 days while the second time period includes the most recent 45 days. Those skilled in the art will readily understand that the length of the time periods may depend on a myriad of factors, including the type of activity conducted, the organization's structure and activities, the IT infrastructure, and other factors.

By comparing values obtained during the first period with values of the same user account during the second period, it may be determined if a user account's activity is abnormal. Each activity measured (or notification of the results of such measurements) may be accorded a different weight, for example, a security threat may be weighted differently than an ethical threat. Likewise, a blocked transmission may be weighted differently than a transmission that is not blocked, however, contains improper material. As shown, illustrative block 310 may be implemented to weight different activities. Table 1, described below in relation to block 310, provides one illustrative weighting scheme that may be implemented in block 308 or any other process in accordance with the invention. While block 308 is shown below block 306, those skilled in the art will readily appreciate that block 308 may occur before, during, or after any block. In one embodiment, one or more processes may be conducted as soon as the activity is detected.

Illustrative block 308a may be employed to receive an indication if a user account comprises an activity level during the first time period that is over a first threshold level above an average of the same user account during the second time period (denoted hereafter as "$spike_x$", where $x$ is the specific activity. For example, in one embodiment, each activity considered as part of blocks 302-306 (and even 308) may be considered. Yet in other embodiments, only certain activities, such as the traffic measured in sub-block 302a, is considered. In one embodiment, the predetermined threshold may be about 40% of the average of the user account's activity during the second time period. In other embodiments, the predetermined threshold may be a value less than or greater than 40%.

Block 308b may be implemented to compare a user account with other user accounts. For example, in one embodiment, an indication may be received to indicate whether a user account comprises an activity level that is over a first threshold level above an average of a plurality of user accounts for the same time period (hereinafter referred to as "aboveavg$_x$", where $_x$ is the specific activity or control).

The timing of a user account's activity within the first or second time period may be considered in any analysis (see, e.g., block 308c). In one embodiment, an indication may provide information whether the user account comprises an activity level during a time frame within the first time period that is determined to be before or after the average start or end time for that user account. For example, if a user account suddenly shows a lot of activity during a different frame (i.e., about 6 hours before they are scheduled to work) this may be weighted to further increase the user account's ranking. In one embodiment, the user account's activity level during a second time period (which may be expressed as an average) is compared with the recent activity level. In other embodiments, certain time frames, such as holidays, weekends may be weighted in additional analysis. In one embodiment, the output of block 308c may be expressed as OffHours$_x$, where $_x$ is the specific activity.

In one embodiment, each of block 308a-308c may be implemented. One illustrative embodiment implementing blocks 308a-308c is described later in this disclosure.

In further embodiments, a weight assigned to an activity may depend on whether the activity occurred within the first time period or another time period (block 310). The second time period may include all past data obtained for the relevant activity. Table 1 shows one illustrative weighting scheme that may be used in accordance with various embodiments of the invention. As shown in Table 1, a weighting applied to an activities may differ from at least one other activity, even if it occurs during the same time frame. Additionally, a weighting applied to an activity may differ depending if the activity occurred during the first time period or during a second time period.

TABLE 1

Exemplary weighting scheme

| Control | Weight - If occurred during first time period | Weight - If occurred during another time period (i.e. second time period or all past data) |
|---|---|---|
| Security Threat | 3.5 | 2 |
| Ethical Threat | 1.5 | 1 |
| Unauthorized Protocol | 3.5 | 2 |
| Illegal write attempt | 5 | 3 |
| Blocked Targeted Correspondence | 5 | 3 |
| Access to specific data store | 3.5 | 2 |
| Targeted Correspondence that violates rule | 4 | 3 |

Those skilled in the art will readily appreciate that the above categories are merely illustrative and that other categories may be implemented. Further, at least one of the categories may further be subdivided into one or more subcategories.

In further embodiments, a weight may be assigned to certain user accounts (see, e.g., block 312). In certain scenarios, it may be advantageous to weight one account differently than another. For example, certain user accounts may have access to highly sensitive data, thus the potential for adverse events is greater. In this regard, different weights may be assigned to different user accounts, regardless of what activity is conducted on that account. For example, different weights may be assigned to accounts depending on whether the account has access rights to a specific collection of data, exempt from having the at least one application (such as for example, a security application), the at least one software application is absent; access rights to at least one service has been deactivated, and combinations thereof. Table 2 shows an exemplary weighting scheme that may be applied to one or more user accounts in accordance with one embodiment of the invention.

| User Account Category | Weight |
|---|---|
| Access to a collection of data | 2 |
| Exempt from application | 1.5 |
| Application missing | 1.5 |
| Exception to monitoring traffic through a network | 1 |
| Exception to monitoring of targeted communication application | 1 |
| Deactivated User | 2 |

Those skilled in the art will readily appreciate that the above categories are merely illustrative and that other categories may be implemented. Further, at least one of the categories may further be subdivided into one or more subcategories.

Certain aspects of the invention are related to computer-readable mediums, such as including memory 115 that contain computer executable instructions, that when are executed by a processor, such as processor 103, process a unique process that incorporates one or more of the principles disclosed above in relation to blocks 302-312. In one embodiment, the computer-executable instructions may be used to calculate a threat score for a plurality of user accounts. As discussed above, some accounts may have access to a first network (such as the Internet) and at least a portion of the user accounts have access to a second network that comprises a centralized store of electronic data, for example confidential information on the organization's intranet.

In one embodiment, an overall threat score ($f_{overall}$) may be calculated for each of the user accounts. In one embodiment, $f_{overall}$ may be determined according to Equation 1:

$$f_{overall} = \frac{(f_{live} + f_{analytic}) * f_{person}}{100} \qquad \text{Equation 1}$$

wherein $f_{live}$ includes the calculation of data from a first time period and is calculated for a plurality of activities and $f_{analytic}$ includes the calculation of data from a second time period and is calculated for the plurality of activities of $f_{live}$ Equation 1a may be used to calculate $f_{live}$ for each activity and Equation 1b may be used to calculate $f_{analytic}$.

$$f_{live} = \sum_{x=0}^{n} x_{greaterThan0}\left(\frac{weight_{x_{live}}}{2}\right) + \left(\frac{hit_x}{max_{hit_x}}\right)\left(\frac{weight_{x_{live}}}{2}\right) \qquad \text{Equation 1a}$$

where $_x$ specifies a predefined activity selected from a plurality of activities, and $$x_{greaterThan0} = \begin{cases} 1, & hits_x > 0 \\ 0, & hits_x = 0 \end{cases}$$

As discussed above, $f_{analytic}$ includes the calculation of data from a second time period and is calculated for the plurality of activities of $f_{live}$. In certain embodiments, the determination of $f_{analytic}$ may include one or more sub-blocks of 308, including 308a, 308b, and/or 308c. For example, Equation 1b provides on illustrative method:

$$f_{analytic} = (\text{spike}_x + \text{aboveAvg}_x + \text{offHours}_x) * (\text{weight}_{x_{analytic}}) \quad \text{Equation 1b}$$

Wherein in one embodiment, spike$_x$ is assigned a zero value unless the user account comprises an activity level during the first time period that is over a first threshold level above an average of the same user account during the second time period, aboveavg$_x$ is assigned a zero unless the user account comprises an activity level that is over a first threshold level above an average of a plurality of user accounts for the same time period, wherein offhours$_x$ is assigned a zero unless the user account comprises an activity level during a time frame during the first time period before or after the average start or end time for that user account.

Returning briefly to Equation 1, there is a variable "$f_{person}$." In the illustrated embodiment, herein $f_{person}$ considers any weights given to the user account. In one embodiment, one or more values from block 312 are used for $f_{person}$.

The exact weights and thresholds applied to the equation may depend on a myriad of factors, including but not limited to preference. For example, some organizations may treat certain behaviors or trends as more risky than others. In one embodiment, spike is assigned a first integer if the first threshold level of spike is about 40% great than the average of the same user account during the second time period. In another embodiment, aboveavg$_x$ is assigned a first integer if the first threshold level of aboveavg$_x$ is above about 30% greater than the activity of the plurality of user accounts for the same time period. In a further embodiment, the offhours$_x$ may be assigned a first integer if the activity level is detected about 6 hours before or after the average start or end time for that user account.

The controls or activities considered for inclusion within the formula to rank the plurality of user accounts may consider any activity, including but not limited to any activity discussed in relation to FIG. 3. Some illustrative activities may include, but are not limited to: a security threat, an ethics threat, blocked communication through the targeted communication application, communication through the targeted communication application meeting the predefined criterion, accessing the centralized store, an attempted illegal storage attempt, and combinations thereof.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

We claim:

1. A non-transitory computer-readable medium storing computer-executable instructions that when executed by a processor cause the processor to perform:
    calculating a ranking of a plurality of user accounts within an organization that represent a threat to the organization, wherein the ranking is determined by a predictive threat score for each user account of the plurality of user accounts, wherein the predictive threat score is based on a comparison of a first set of values of at least four controls that are monitored over a first time period to a second set of values of the at least four controls that are monitored over a second time period, and wherein the values of the first set of values and the second set of values for each user account are selected from the group consisting of:
        a value corresponding to a quantity of bandwidth utilized by the user account over a network;
        a value corresponding to a number of blocked transmissions by the user account over the network;
        a value corresponding to a number of blocked communications through a targeted communication application, the targeted communication application allowing a first user to communicate directly with another individual;
        a value corresponding to a number of non-blocked communications through the targeted communication application that violate at least one predefined criterion;
        a value indicating whether at least one security application is associated with the user account;
        a value indicating an illegal storage attempt; and
        a value indicating whether a communication has been transmitted or received through the network via an unauthorized protocol;
    wherein monitoring the at least four controls further includes:
    assigning, by the processor, a zero value to an activity characteristic unless it is determined that an activity level of a first user account is over a first threshold level above an average of the plurality of user accounts for a same time period and a first integer to the activity characteristic if it is determined that the activity level of the first user account is over the first threshold level above an average of the plurality of user accounts for the same time period; and
    transmitting electronic signals configured to display the ranking of the plurality of user accounts.

2. The non-transitory computer-readable medium of claim 1, wherein the blocked transmissions by the user account over the network are classified into a category selected from the group consisting of: a security threat, an ethics threat, and combinations thereof.

3. The non-transitory computer-readable medium of claim 2, the computer-executable instructions further comprising:
    receiving a user input selecting a graphical representation of the blocked communication through the network; and
    displaying whether the blocked communication was a security threat, an ethics threat or combinations thereof.

4. The non-transitory computer-readable medium of claim 2, the instruction further comprising:
    receiving a user input requesting the re-ranking of the plurality of user accounts based upon one of the values the predictive threat score is based on.

5. The non-transitory computer-readable medium of claim 1, wherein an account weight has been applied to at least one user account displayed, wherein the account weight is assigned to the at least one user account, if the user account is within a category selected from the group consisting of: granted access rights to a specific collection of data, exempt from having the at least one security application, the at least one security application is absent; access rights to at least one service has been deactivated, and combinations thereof.

6. The non-transitory computer-readable medium of claim 5, wherein the at least one user account are weighted according to the weights set forth in Table 2.

7. The non-transitory computer-readable medium of claim 5, the instruction further comprising:
receiving a user input providing a new account weight to be applied to at least one of the plurality of user accounts; and
re-ranking a plurality of accounts using the new account weight.

8. The non-transitory computer-readable medium of claim 5, the instructions further comprising:
receiving a user input selecting a user account from the plurality of user accounts; and
displaying the ranking for a plurality of values selected from the group consisting of:
a value corresponding to the quantity of bandwidth utilized by the user account over the network, a value corresponding to a number of denied access attempts by the user account over the network, a value corresponding to a number of blocked communications through the targeted communication application, a value corresponding to a number of non-blocked communications through the targeted communication application that violate at least one predefined criterion, a value indicating whether at least one security application is associated with the user account, a value indicating whether communications through the network are transmitted or received via an unauthorized protocol, and combinations thereof.

9. The non-transitory computer-readable medium of claim 1, wherein the first time period is less than about 3 days and the second time period is more than about 40 days.

10. The non-transitory computer-readable medium of claim 1, wherein a value weight has been applied to at least one value utilized in determining the predictive threat score, wherein the value weight is assigned to the at least one user account if the user account is within a group selected from the groups consisting of:
a security threat, an ethics threat, blocked communication through the targeted communication application, communication through the targeted communication application meeting the predefined criterion, accessing the centralized store, an attempted illegal storage attempt, and combinations thereof.

11. The non-transitory computer-readable medium of claim 10, the instruction further comprising:
receiving a user input providing a new value weight to be applied to at least one of the values; and
re-ranking a plurality of accounts using the new value weight.

12. The non-transitory computer-readable medium of claim 10, further comprising:
determining that an activity associated with one of the values occurred during a time frame of either the first time period or the second time period; and
applying a second value weight to the activity that occurred during the time frame.

13. The non-transitory computer-readable medium of claim 10, further comprising:
further weighting one of the values if incidence of activity associated with the value is above a predetermined threshold.

14. The non-transitory computer-readable medium of claim 13, wherein the predetermined threshold is based upon, an average activity of one of the user accounts of the plurality of user accounts, an average activity of at least one of the other user accounts of the plurality of user accounts, or combinations thereof.

15. The non-transitory computer-readable medium of claim 10, wherein the activities that occurred during the first time period are weighted differently than the activities that occurred during the second time period.

16. The non-transitory computer-readable medium of claim 15, wherein the activities that occurred during the first time period and the second time period are weighted according to the weights set forth in Table 2.

17. An apparatus comprising:
a communications module configured to receive data from a plurality of applications, the data relating to a first set of values of at least four controls and a second set of values of the at least four controls associated with each user account of a plurality of user accounts within an organization, wherein the first set of values are monitored over a first time period and the second set of values are monitored over a second time period, and wherein the values of the first set of values and the second set of values for each user account are selected from the group consisting of:
a value corresponding to a quantity of bandwidth utilized by the user account over a network;
a value corresponding to a number of blocked transmissions by the user account over the network;
a value corresponding to a number of blocked communications through a targeted communication application, the targeted communication application allowing a first user to communicate directly with another individual;
a value corresponding to a number of non-blocked communications through the targeted communication application that violate at least one predefined criterion;
a value indicating whether a communication has been transmitted or received through the network via an unauthorized protocol;
an application detection module configured to determine whether at least one security application is associated with at least one of the user accounts; and
a processor connected to a memory and configured to respectively calculate a predictive threat score for each user account of the plurality of user accounts based on a comparison of the first set of values to the second of values that are respectively associated with each user account of the plurality of user accounts,
wherein monitoring the at least four controls further includes:
assigning, by the processor, a zero value to an activity characteristic unless it is determined that an activity level of a first user account is over a first threshold level above an average of the plurality of user accounts for a same time period and a first integer to the activity characteristic if it is determined that the activity level of the first user account is over the first threshold level above an average of the plurality of user accounts for the same time period; and transmit electronic signals configured to display the calculated predictive treat score for each user account of the plurality of user accounts.

18. The apparatus of claim 17, wherein the processor is further configured to determine that an activity associated with one of the values occurred during a time frame of either the first time period or the second time period; and applying a value weight to the activity that occurred during the time frame.

19. The apparatus of claim 17, further comprising: further weighting one of the values if incidence of activity associated with the value is above a predetermined threshold.

20. The apparatus of claim 19, wherein the predetermined threshold is based upon, an average activity of one of the user accounts of the plurality of user accounts, an average activity of at least one of the other user accounts of the plurality of user accounts, or combinations thereof.

21. The apparatus of claim 17, wherein the activities that occurred during the first time period are weighted differently than the activities that occurred during the second time period.

* * * * *